| United States Patent [19] | [11] 4,050,306 |
|---|---|
| Khalid | [45] Sept. 27, 1977 |

[54] METHOD AND APPARATUS FOR MEASURING PRESSURES

[75] Inventor: Syed J. Khalid, Cincinnati, Ohio

[73] Assignee: General Electric Company, Cincinnati, Ohio

[21] Appl. No.: 661,980

[22] Filed: Feb. 27, 1976

[51] Int. Cl.² .................. G01L 7/00; G05D 11/00
[52] U.S. Cl. .................................. 73/212; 73/420; 137/112
[58] Field of Search ............... 73/212, 182, 115, 420; 137/112, 113

[56] References Cited

U.S. PATENT DOCUMENTS

| 2,761,463 | 9/1956 | Wagner | 137/112 |
|---|---|---|---|
| 3,868,625 | 2/1975 | Speigner et al. | 73/115 |

Primary Examiner—Donald O. Wood
Attorney, Agent, or Firm—Dana F. Bigelow; Derek P. Lawrence

[57] ABSTRACT

A pair of pressure sensing probe tubes are placed in the fan discharge of a turbofan engine, aft of the outlet guide vanes (OGVs) the tubes being circumferentially spaced by a fraction of the OGV pitch. A comparing means receives both pressures sensed by the double-barrelled probes and aerodynamically actuates to automatically select the higher of the two pressures. An accurate pressure indication representative of the mainstream pressure is therefore obtained despite the localized lower pressure turbulence area that may be caused by the presence of the upstream outlet guide vane(s).

12 Claims, 7 Drawing Figures

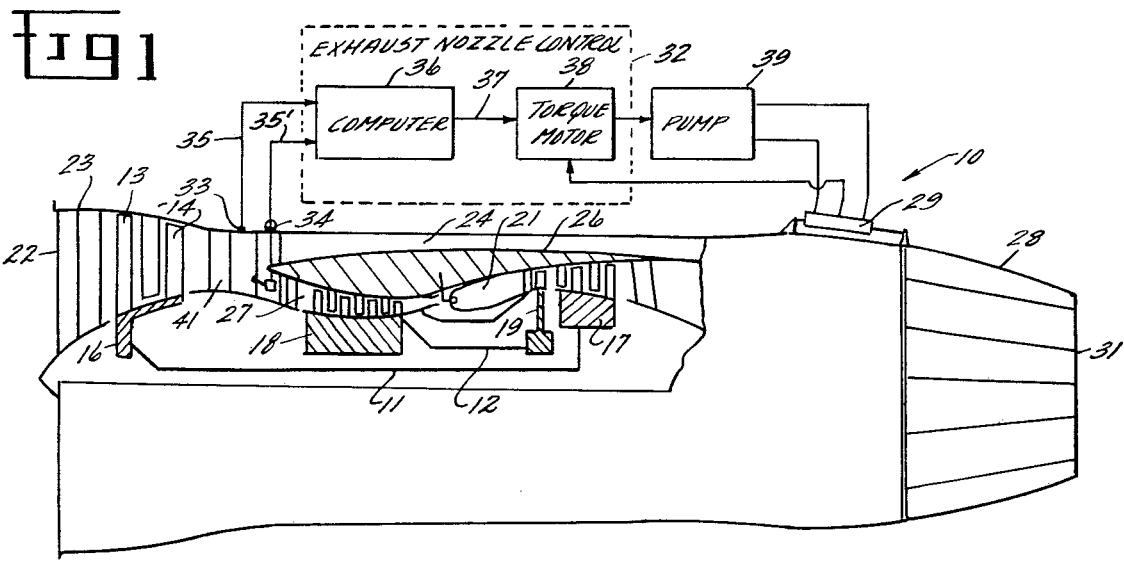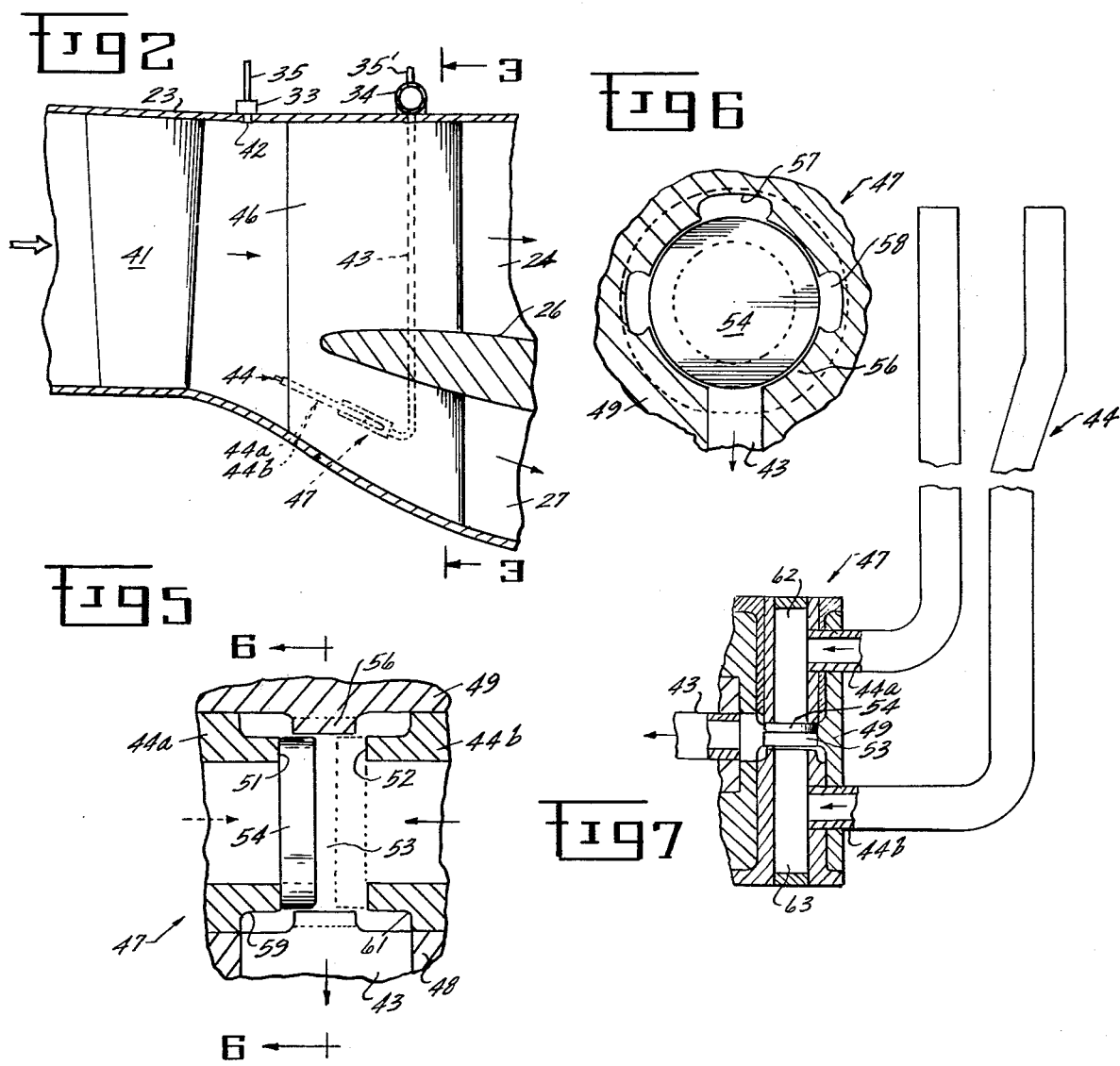

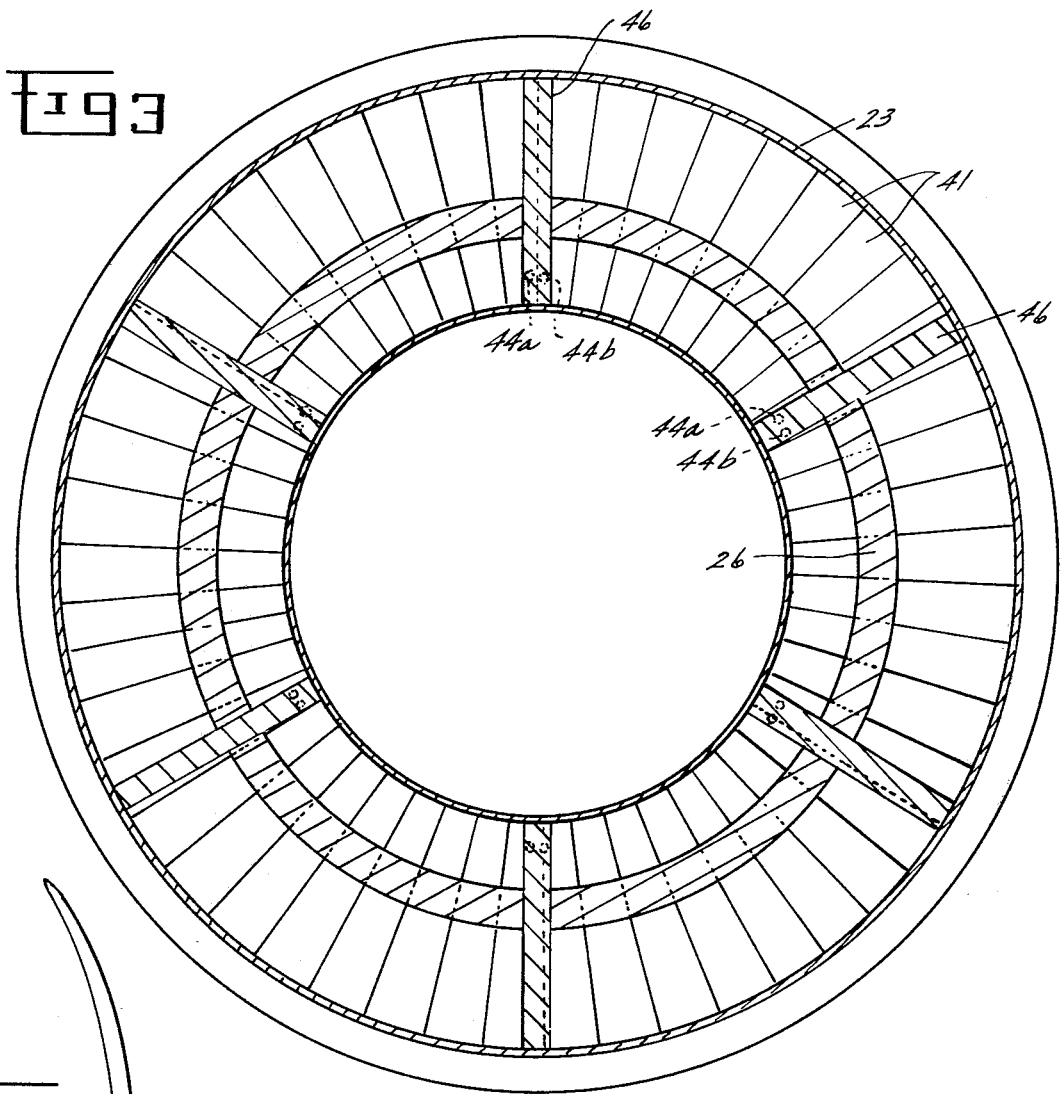
Fig 3
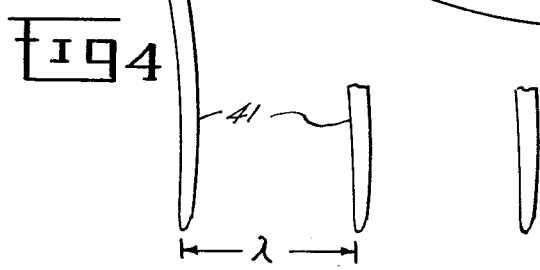
Fig 4
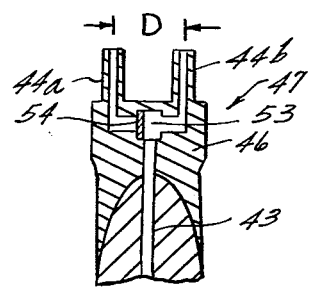

METHOD AND APPARATUS FOR MEASURING PRESSURES

The invention herein described was made in the course of or under a contract, or subcontract thereunder, with the U.S. Department of the Air Force.

BACKGROUND OF THE INVENTION

This invention relates generally to gas turbine engines and, more particularly, to a method of accurately sensing the fan discharge total pressure in a fan duct having outlet guide vanes disposed therein.

In the control of turbomachinery, where certain operational parameters are sensed and changes made to bring about a desired performance, it is often required to sense mainstream pressure at a position behind an obstruction in the mainstream flow such as, for example, turbomachinery stators in the turbine area, or outlet guide vanes in the fan duct area. This is true because the flow field upstream of the obstruction may be too complex for purposes of sensing operational conditions. If the total pressure is being sensed, it is important to have a consistent mainstream pressure measurement, free from the effect of wakes or boundary layers. Consistent acquisition of this pressure with ordinary probes becomes difficult because the local low pressure regions (wakes or boundary layers) wander with operating conditions. In addition, hardware manufacturing tolerances may also cause variations of wake locations. It is therefore difficult, if not impossible, to predict the exact location where a sensor can best be placed within the mainstream in order to avoid the flow disturbance from the hardware.

In particular, one method of maintaining the fan operating line of a turbofan engine is by regulating the exhaust nozzle so as to maintain a constant value of [fan discharge total pressure ($P_t$) − fan discharge static pressure ($P_s$) / fan discharge static pressure ($P_s$)] or $\Delta P/P$. Since the fan discharge total pressure, $P_t$, is necessarily sensed at a location behind the outlet guide vane in the fan duct, the wakes created by the outlet guide vane tend to cause a low, nonrepresentative $P_t$ acquisition, with the resultant nozzle opening lowering the fan discharge pressure below the level desired. This induced error becomes more predominant at higher speeds when the wake becomes more pronounced. Because of slight structural differences between engines, the location of these pressure defects with respect to the probes could vary from engine to engine. Further, since the characteristic flow around the outlet guide vanes will vary with engine operating conditions, the desirable location of the probes with respect to the outlet guide vanes is also dependent upon engine operating conditions. Hence, proper positioning of the $P_t$ probes for sensing pressure behind the outlet guide vane discharge low pressure region cannot be accomplished with certainty.

It is therefore an object of this invention to accurately maintain the fan operating line of a turbofan engine.

Another object of this invention is to provide a means of accurately sensing the fan discharge total pressure in a fan duct having a plurality of outlet guide vanes.

Another object of this invention is to provide in a turbofan engine a means of sensing the fan discharge total pressure without introducing errors caused by the wake of outlet guide vanes within the duct.

These objects and other features and advantages become more readily apparent upon reference to the following description when taken in conjunction with the appended drawings.

SUMMARY OF THE INVENTION

Briefly, in accordance with one aspect of the invention, wherever a single probe is normally placed in the fan duct to sense the fan discharge total pressure, a pair of circumferentially spaced probe tubes are placed in that location to discretely sample the pressure at each of the probe tube positions. The relative spacing of the probe tubes is a fraction of the pitch of the outlet guide vanes (one-half pitch or less), so that if either of the probe tubes is within the wake of the outlet guide vane so as to cause an erroneous reading, the other probe tube will be outside of the low pressure area and will therefore provide a representative mainstream pressure. The outputs from both probe tubes are provided to an aerodynamically actuated comparing valve which automatically selects the higher pressure from the tube outside of the turbulence area for use in the control function.

By another aspect of this invention, the comparing means is a valve having two inlet ports for receiving the pressure indicative of flow from the respective probe tubes, and an outlet port which provides the desired pressure indication used for control purposes. A piston within the valve communicates with the flow from each of the two probes so as to be axially moved toward and in abutment with the inlet port having the lower pressure to thereby close said lower pressure inlet port and allow the flow from the higher pressure inlet port to flow to the manifold for use in control.

By yet another aspect of this invention, the diameter of the comparator valve piston is slightly smaller than that of the cylinder in which it resides, so that the lightweight piston, or disc, is aerodynamically moved to the low pressure side of the cylinder by the flow of air to thereby provide a highly responsive valve.

In the drawings as hereinafter described, a preferred embodiment and a modified embodiment are depicted; however, various other modifications and alternate constructions can be made thereto without departing from the true spirit and scope of the invention.

BRIEF DESCRIPTION OF THE DRAWINGS

FIG. 1 is a schematic representation of a turbofan engine having pressure sensing control apparatus.

FIG. 2 is a fragmentary view thereof showing the location of the pressure sensing devices with respect to the outlet guide vanes.

FIG. 3 is an axial section view of the fan duct portion of the engine as seen along lines 3—3 of FIG. 2.

FIG. 4 is a fragmentary longitudinal section view showing the installed probe tubes in relation to the outlet guide vanes.

FIG. 5 is a fragmentary cross section of the valve portion of the present invention.

FIG. 6 is a partial sectional view thereof as seen along line 6—6 of FIG. 5.

FIG. 7 shows another embodiment of the valve portion of the present invention.

DESCRIPTION OF THE PREFERRED EMBODIMENT

Referring now to FIG. 1, a turbofan engine 10 is shown to include a fan rotor 11 and a core engine rotor 12. The fan rotor 11 includes a plurality of fan blades 13 and 14 mounted for rotation on a disc 16, in a low pressure or fan turbine 17, which drives the fan disc 16 in a well-known manner. Core engine rotor 12 includes a compressor 18 and a power or high pressure turbine 19 which drives the compressor 18. The core engine also includes a combustor 21 which combines a fuel with the airflow and ignites the mixture to inject thermal energy into the system.

In operation, air enters the gas turbine engine 10 through an air inlet 22 provided by means of a suitable cowling or nacelle 23 which surrounds the fan rotor 11. Air entering the inlet 22 is compressed by means of the rotation of the fan blades 13 and 14 and thereafter is split between an annular passageway 24, defined by the nacelle 23 and an engine casing 26, and a core engine passageway 27 having its external boundary defined by the engine casing 26. The pressurized air which enters the core engine passageway 27 is further pressurized by means of a compressor 18 and thereafter ignited along with the high energy from the combustor 21. This highly energized gas stream then flows through the high pressure turbine 19 to drive the compressor 18 and thereafter through the fan turbine 17 to drive the fan rotor disc 16. Gas is then passed out the main nozzle 28 to provide propulsive forces to the engine in a manner well known in the art. Additional propulsive force is gained by the exhaust pressurized air from the annular passage 24, which air may be exhausted from the nozzle 28 separately from the core exhaust gas, or may be mixed therewith in a manner well known in the art prior to its exhaust. An afterburner (not shown) may be installed downstream of the mixer device for the injection of fuel into the mixed gas stream with subsequent ignition to produce an augmenting propulsive force when the combustion gas is exhausted out the nozzle 28.

It should be noted that where a mixer is installed in the engine to mix the fan stream flow with that of the core engine exhaust gases, only a single nozzle 28 is required for the discharge of the combined gas stream. A plurality of actuators 29 are generally provided to selectively vary the exhaust opening area 31 of the nozzle 28 so as to control the fan operating line of the turbofan engine in a manner well known in the art. For example, if the nozzle opening 31 is at a minimum-area position, and the operational conditions of the engine are such that the exhaust gases from the mixer tend to create a back pressure in the duct 24, the adverse pressure gradient will tend to drive the fan to stall. However, an exhaust nozzle control 32 acts to monitor the operational conditions of the engine and to cause the actuators 29 to open the nozzle 28 and provide a larger discharge area 31 so as to relieve the back-pressure within the duct 24 and thereby maintain the desired fan operating line.

It has been found that this fan operating line may be controlled by regulating the primary exhaust nozzle so as to maintain a constant value of [fan discharge total pressure ($P_t$) − fan discharge static pressure ($P_s$) / fan discharge static pressure ($P_s$)] or, $\Delta P/P$ which is uniquely related to fan duct Mach number. The two operational parameters $P_t$ and $P_s$, are accomplished by way of sensors 33 and 34, respectively, which extend through the nacelle 23 and into the fan discharge gas stream (FIGS. 1 and 2). Actually, there is a plurality of each of the sensors 33 and 34 circumferentially spaced around the engine nacelle, with the outputs of each of the two types being transmitted to their respective manifold which in effect averages the sensed values around the circumference of the engine. However, for simplicity, the sensors 33 and 34 of FIGS. 1 and 2 are shown as single sensors with their respective outputs being transmitted to the computer 36 of the exhaust nozzle control by way of lines 35 and 35', respectively. Computer 36 automatically calculates the existing $\Delta P/P$ ratio, compares it with the desired value of $\Delta P/P$ ratio and provides an output along line 37 to the torque motor 38 which in turn drives a hydraulic pump 39 for selective operation of the actuators 29. In this way, the output of the computer 36 operates to maintain a constant $\Delta P/P$ for a given set of flight conditions. When operating under variable flight conditions, the desired $\Delta P/P$ ratio may be different, the variation being defined by a prescribed schedule, so as to optimize the operation of the engine over those flight conditions. At each flight condition, however, the desired $\Delta P/P$ ratio is a unique value which has to be maintained by the exhaust nozzle control.

Referring now to FIG. 2, the precise axial locations of the sensors 33 and 34 are shown with respect to the outlet guide vanes 41 which extend radially across the main air duct to straighten the discharge airflow from the fan. It will be seen that the static-pressure sensor 33 has a sensor tube 42 disposed immediately downstream of the outlet guide vane 41 and in close proximity to the duct wall or nacelle 23. The total-pressure sensor 34, on the other hand, is connected to a radially extending tube 43 which connects to the sensor tube 44, disposed in a radially inward location with its open end facing the mainstream flow. As mentioned hereinbefore, there is actually a plurality of such sensor tubes disposed circumferentially around the engine to collectively obtain the average of the total-pressure ($P_t$) value within the mainstream duct. FIG. 3 shows a particular arrangement of the circumferentially spaced sensor tubes with each of the sensors being arcuately spaced approximately 60° from the adjacent sensors on either side thereof. The number and relative location of the sensors can, of course, be varied to accommodate any particular design requirements. It will be seen that in the present configuration, the plurality of fan frame struts 46 are effectively used to locate and contain the sensing apparatus, with each of the struts 46 containing a radially extending tube 43 and an attached pair of sensing tubes 44a and 44b in accordance with the present invention. It will also be seen that the number of outlet guide vanes 41 is substantially large as compared with the number of struts 46, and associated sensing tube pairs 44. Unless the number of struts 46 is equally divisible into the total number of outlet guide vanes 41, the relative circumferential location of each of the struts with respect to its adjacent upstream outlet guide vane 41, will be different from that of the others. Further, even if the total number of struts 46 is equally divisible into the total number of outlet guide vanes 41, the relative positions of the struts with respect to their adjacent outlet guide vane 41 will most likely vary because of mechanical tolerances. Accordingly, with the conventional sensing tube arrangement, wherein there is a single sensing tube 44 at each of the struts 46, a portion of the sensor tubes 44 may be disposed in a desirable circumferential position such that they are not affected by the wake of the adjacent outlet guide vane 41, whereas another portion thereof will be disposed so as to be affected by the wake of their adjacent outlet guide vanes 41. The most desirable positions are difficult to predict in view of the complex and unpredictable fan discharge flow field. When an average is taken from the total number of sensors to obtain an average total pressure $P_t$, an error will be introduced to the degree that there are in fact sensors which are disposed in the wake of the outlet guide vanes.

Referring to FIGS. 2 and 4, the pair of sensor tubes 44a and 44b are shown in the installed position within the strut 46 at a position downstream of the outlet guide vane 41. Assuming that the adjacent outlet guide vanes 41 are circumferentially spaced at a distance λ(pitch), there will be an area behind each of the outlet guide vanes 41 where a wake is created, and where an erroneous sensing function will be obtained if the sensor 47 is disposed in that area. The width of this wake area will, of course, be dependent on the operational conditions of the engine. There will also be a free flow area between each pair of outlet guide vanes 41 where the air will flow relatively undisturbed, as directed by the outlet guide vanes, and where a true total pressure $P_t$ sensing function will be obtained. Assuming that the desired placement of the sensor with respect to its adjacent outlet guide vane cannot always be accomplished and, further, that the path of the wake behind an outlet guide vane cannot always be predicted under different operating conditions, the present invention provides a pair of sensor tubes 44a and 44b so that if one tube is disposed in the wake of an outlet guide vane, the other tube will not be and will therefore provide for an accurate sensing of the total pressure ($P_t$) of that circumferential position within the duct.

The distance D between the sensor tubes 44a and 44b is preferably selected to suit a particular application design. Since the width of the outlet guide vane wake will vary considerably with particular design configurations, that dimension is most important in the relative spacing of the sensor tubes 44a and 44b. It will be recognized that the distance between sensing tubes 44a and 44b should be greater than the predicted width of the outlet guide vane wake in order to ensure that at least one of the sensor tubes 44a or 44b is always disposed outside of the wake area. If either of the sensor tubes 44a or 44b are disposed in the wake area, the pressure and, therefore, the resultant fluid flow will be less in that tube than in the other. The pressure tube outside of the wake area can therefore be distinguished from that which is in the wake area by comparing the pressures in the two tubes and selecting the higher one. This is accomplished by way of a comparing valve 47 which receives the fluid flow from each of the sensor tubes 44a and 44b and selects the one having the higher pressure for delivery along an outlet tube 43 to the sensor 34. Details of the comparing valve 47 can be more easily seen by reference to FIGS. 5 and 6.

The comparing valve 47 comprises a cylinder 49 connected at its opposite ends to the respective sensor tubes 44a and 44b, and fluidly communicates at a point therebetween with an outlet tube 43. The ends 51 and 52 of the sensor tubes 44a and 44b, respectively, are mutually spaced so as to define, along with the surrounding cylinder 49, a cavity 53 which fluidly communicates with each of the sensor tubes 44a and 44b, as well as the outlet tube 43. Disposed within the cavity 53 is a lightweight piston or disc 54 which is adapted to be translatable within the cavity to abut either of the ends 51 or 52 to close off the fluid flow from that particular sensor tube. It will be understood that the piston may take on any of a number of forms such as, for example, a ball or a cylinder. Surrounding the disc 54 is a boss 56 which extends radially inwardly as a part of the cylinder 49 to closely surround the disc 54 and thereby provide a guiding means for a transverse movement within the cavity 53. The boss 56 has a plurality of scallops 57 formed therein to form aerodynamic slots 58 intermediate the disc 54 and the cylinder 49. Cutouts 59 and 61 formed in the sensor tubes 44a and 44b, respectively, fluidly communicate with both the cavity 53 and the slots 58 to provide even a greater freedom of movement of any pressurized air which may be in the cavity 53.

In operation, assume that one of the sensor tubes 44a or 44b is disposed within the wake of the outlet guide vanes 41, and that its sensed pressure (fluid flow) is lower than that of the other sensor tube. When these fluid flows arrive at the comparing valve 47, the higher pressure flow from either of the two sensor tubes will flow around the disc 54 and force it to move toward the end of the lower pressure side, and finally into abutment with the end thereof so as to shut off the flow of the lower pressure fluid. The higher pressure flow will then flow through the cavity 53 and into the outlet tube 43 where it is supplied as discussed hereinbefore. During the time that disc 54 is moving to the low pressure side, the high pressure airflow is transmitting through the slots 58 and around the disc 54 to provide an aerodynamic lift to the disc 54. This feature, combined with the use of a lightweight disc 54, provides a highly responsive and sensitive valve for distinguishing between the pressures of the sensor tubes 44a and 44b. The valve will be held against the low pressure port due to the force created by the differential pressure.

Another embodiment of the present invention is shown in FIG. 7, wherein the sensor tubes 44a and 44b enter the cylinder 49 on the same side and enter respective chambers 62 and 63 disposed on either side of the cavity 53. After the disc 54 moves to shut off flow from one of the chambers, the resultant discharge is made by the singular outlet tube 43.

Having thus described the invention, what is considered novel and desired to be claimed by Letters Patent of the United States is:

1. An improved pressure sensing probe of the type for placement within a fluid flow chamber downstream of a plurality of spaced obstructions, and delivery of the flow to a pressure sensitive device to obtain an indication of pressure wherein the improvement comprises:
    a. a pair of probe tubes having open ends for placement at spaced positions within a fluid chamber for conducting the flow of fluid therefrom; and
    comparing means interconnecting the tubes' other ends and adapted to discharge to the pressure sensitive device the flow only from the tube having the higher pressure when there is a variance of pressure between said spaced positions.

2. An improved pressure sensing probe as set forth in claim 1 wherein said comparing means comprises a fluid valve whose piston blocks the flow of fluid from the tube having the lower pressure therein.

3. An improved pressure sensing probe as set forth in claim 1 wherein said tube other ends discharge into opposite ends of a piston containing cylinder.

4. An improved pressure sensing probe as set forth in claim 3 wherein said comparing means comprises a compartment fluidly communicating with a pressure sensing device and fluidly connected on opposite ends thereof to said tube other ends and having a piston movably disposed therein for abutting either of the end walls of the compartment to block the fluid flow path from the tube having the lower pressure.

5. An improved pressure sensing probe as set forth in claim 4 wherein said compartment further comprises side walls interconnecting said compartment end walls, the side walls defining a transverse cross-sectional area slightly larger than that of the piston so as to provide a flow path between said piston and said side walls.

6. An improved pressure sensing probe as set forth in claim 5 and including guide vanes for said piston for maintaining its transverse position with respect to said side walls.

7. An improved pressure sensing probe of the type set forth in claim 4 wherein said compartment is a cylinder in form and said piston comprises a disc.

8. An improved valve of the type having a cylinder, a pair of inlet ports, an outlet port, and a piston which moves within the cylinder to selectively open and close the inlet ports wherein the improvement comprises:
   a. a cylinder having end walls and side walls defining a pressure chamber;
   b. an outlet port fluidly communicating with said chamber;
   c. inlet ports oppositely disposed in said end walls and susceptible to having different fluid pressures existing therein;
   d. a piston movably disposed within said chamber and adapted to be axially moved toward, and in abutment with, the inlet port having the lower pressure to thereby close said lower pressure inlet port; and,
   e. guide means disposed between said cylinder side walls and said piston, said guide means having a plurality of surfaces in close positional relationship with said piston to provide a guide for maintaining said piston on the axis of said cylinder.

9. An improved valve as set forth in claim 8 wherein said piston has a diameter slightly smaller than the inside diameter of said chamber.

10. An improved valve as set forth in claim 8 including an annular cavity between said piston and said cylinder, said cavity providing a fluid flow path around said piston during its movement from one inlet port to the other.

11. An improved valve as set forth in claim 8 wherein said piston comprises a relatively lightweight disc.

12. An improved valve as set forth in claim 8 wherein said guide means comprises a plurality of circumferentially spaced bosses extending from said side walls.

* * * * *